STAND FOR TELEVISION RECEIVER

Filed Dec. 28, 1956

INVENTOR.
Anthony T. Monaco,
BY Mueller & Aichele
Attys.

2,893,674
Patented July 7, 1959

2,893,674

STAND FOR TELEVISION RECEIVER

Anthony T. Monaco, Skokie, Ill., assignor to Motorola, Inc., Chicago, Ill., a corporation of Illinois Application December 28, 1956, Serial No. 631,126

3 Claims. (Cl. 248—183)

This invention relates to new and useful improvements in stands for television receivers and more particularly a small compact stand for a "portable" television receiver which includes means permitting 360° of rotation of the stand and a limited tipping of the supporting portion of the stand backward or forward from a horizontal position.

In the development of small table model or portable size television receivers there has also developed a need for a small compact stand for such receivers permitting for rotation of the television receiver and a limited tipping motion above or below the horizontal plane.

It is therefore one object of this invention to provide a new and improved stand for a television receiver which is simple and economical to construct and assemble.

Another object of this invention is to provide a new and improved stand for television receivers which permits rotation of the television receiver and which also permits tipping of the receiver above or below the horizontal plane.

A further object of this invention is to provide an improved stand for a television receiver which permits rotary and tipping movement of the receiver and which will maintain any position in which it is set.

One of the features of this invention is the provision in a stand for a television receiver of a pivotal connection permitting both rotary and tipping movement of the supporting portion of the stand.

Another feature of this invention is the provision of the stand for a television receiver which permits rotary and tipping movement of a television receiver supported thereon and includes a frictional means to hold the supporting portion in any position in which it is set.

A further feature of this invention is the provision of a television supporting stand which is formed of a very small number of easily fabricated parts which are simple and inexpensive to fabricate and assemble.

Other objects and features of this invention will become apparent from time to time throughout the specification and claims as hereafter related.

Figures 2, 3:
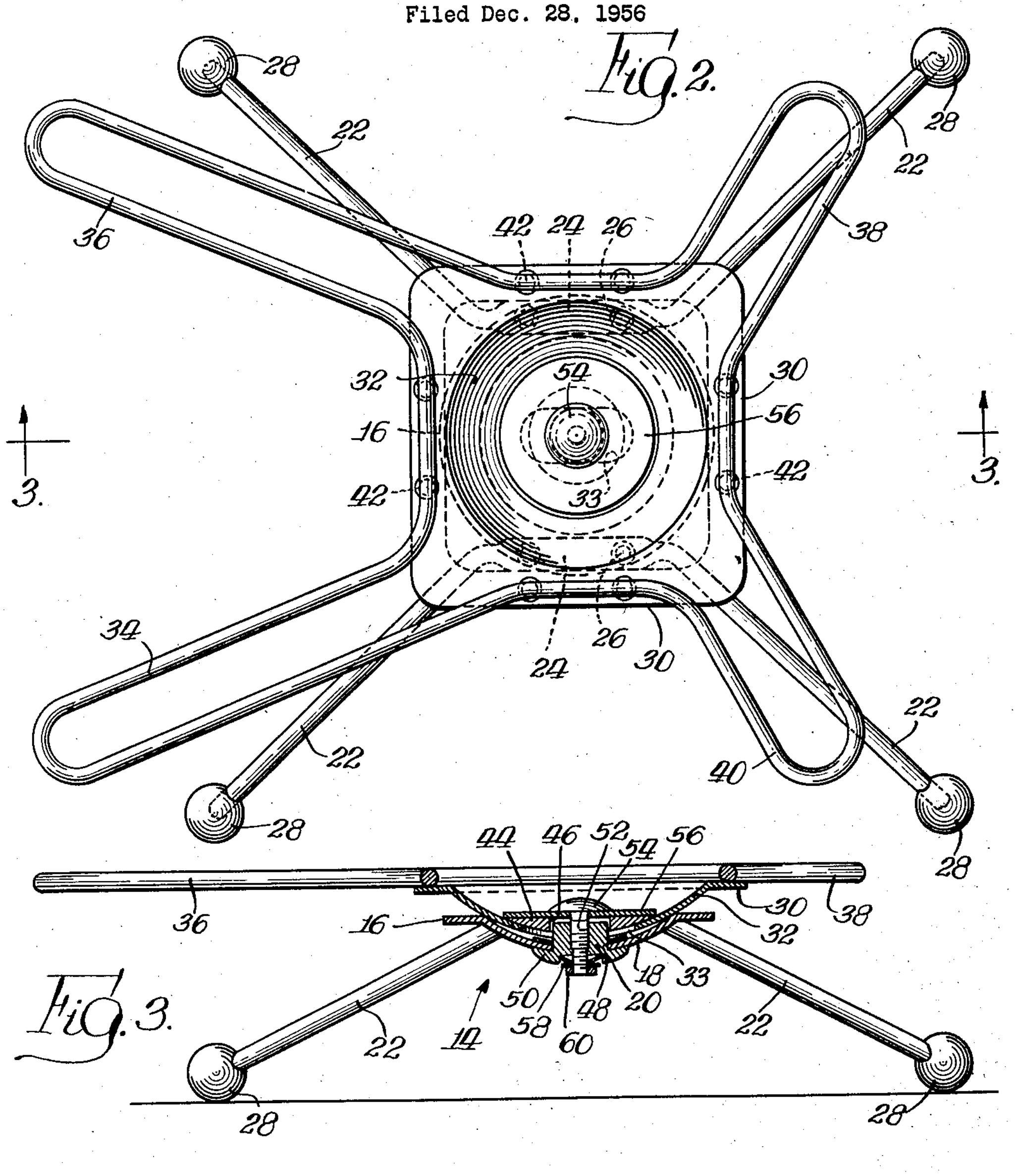
Figure 1:
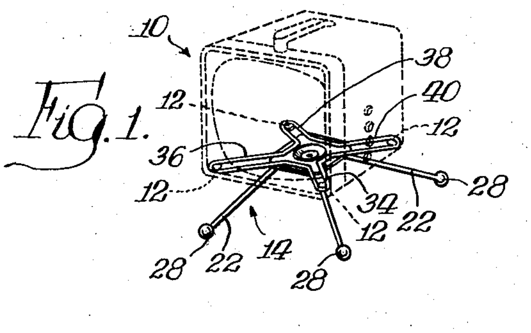

In the accompanying drawings, to be taken as part of this specification, there is clearly and fully illustrated a preferred embodiment of this invention in which drawings:

Fig. 1 is a perspective view of a supporting stand for a television receiver with the television receiver supported thereon shown in dotted lines, Fig. 2 is a plan view of the rotary stand for a television receiver as shown in Fig. 1, and Fig. 3 is a sectional view taken on the line 3—3 of Fig. 2 and showing the construction and assembly of the supporting and base portions of the rotary stand.

This invention consists of a new and improved television supporting stand having a base portion which includes a spherically dished supporting plate having four legs extending downwardly and outwardly therefrom. A television chassis supporting portion is also provided which is supported on the base portion and consists of a supporting plate having a spherically dished central portion which is positioned for rotary and tipping movement on the dished portion of the supporting plate of the base. The chassis supporting plate has a plurality of hairpin shaped supporting arms of metal rod extending outwardly therefrom and adapted to receive and support the feet of a small portable or table model television receiver. The dished portion of the chassis supporting plate has a slot therein through which extends a supporting post which is arranged to clamp the dished portions of the chassis supporting plate and the base plate together. The chassis supporting member and plate are arranged to have rotation about the supporting post and the slot permits tipping movement of the chassis supporting member. A spring clamping arrangement is provided in connection with a supporting post to provide the frictional force required to hold the chassis supporting member in any position in which it is set.

Referring to the drawings by numerals of reference and more particularly to Fig. 1 there is shown a television receiver 10 which is positioned with its feet or supporting knob portions 12 on the supporting arms of a rotary stand 14. The rotary stand 14 is shown in more detail in Figs. 2 and 3 and includes a supporting base and a chassis supporting portion. The base of the stand includes a plate-like member 16 which has a spherically dished central portion 18 with an aperture 20 therein. A plurality of legs 22 of metal rod are provided for the base of the stand 14 and have a flat central portion 24 which is secured to the base plate member 16 by any suitable means such as spot welding at 26. At the lower ends of the legs 22 there are provided supporting feet 28 which are preferably spherical members of rubber or plastic. The upper or supporting portion of the stand 14 includes a supporting plate member 30 having a spherically dished central portion 32 with a slot 33 therein. The spherically dished portion 32 has a radius of curvature which is greater than the spherically dished portion 18 and thus engages and rides upon the plate 16 on the rim of the dished portion 18.

The supporting plate 30 has secured thereon a plurality of hairpin shaped supporting arms 34, 36, 38 and 40 of metal rod which are secured as by spot welding at the points 42. The rebent end portions of the hairpin shaped legs lie in a common plane and are adapted to receive the feet portions 12 of the television receiver 10. The supporting portion of the stand 14 is positioned with the dished portion 32 riding on the dished portion 18 and the slot 33 aligned with the aperture 20. A clamping member 44 is positioned over the slot 33 in the dished portion 32 and has a spherically curved surface matching the dished portion 32 and a flat upper surface. The clamping member 44 has an aperture 46 through which there is positioned a hollow supporting post member 48. The supporting post member 48 has a head portion 50 which seats against the lower side of the spherically dished portion 18 and has a central aperture for receiving a clamping bolt. A clamping bolt 52 is positioned in the hollow supporting post 48 and has a head portion 54 and washer 56 engagable with the upper flat portion of the clamping member 44. At the lower end of the clamping bolt 52 there is positioned a spring washer 58 which is held in position by a nut 60.

The rotary television supporting stand 14 which has been thus described is simple and easy to construct and operate. The supporting arms 34, 36, 38 and 40 are adapted to receive the feet 12 of a television receiver 10 and to support the television receiver thereon. The difference in length of a supporting arm causes the television receiver 10 to be supported with its center of gravity closer to the center of rotation of the stand. The supporting legs 22 of the stand extend downwardly and outwardly at a rather flat angle and provide a low supporting base structure which is not easily tipped over. The arrangement of the supporting post in the aperture 20 and slot 33 permits the supporting portion of the stand to be rotated through a full 360° to position the television receiver in any desired position. The slot 33 permits movement of the dished portion 32 relative to the supporting post 48 and permits the supporting portion of the stand to be tipped above or below the horizontal plane so that the television receiver may be viewed from a lower or upper position. The arrangement of the clamping member 44 and the bolt 52, nut 60, and clamping spring washer 58 causes the dished portion 32 of the supporting plate 30 to be held resiliently in engagement with the dished portion 18 of the base supporting plate 16 and thus permits easy rotation of the stand to different angular positions and different tipped positions above or below the horizontal plane while at the same time providing sufficient frictional force to retain the stand in any position in which it is set.

I claim:

1. A rotary stand for a television receiver including in combination, a base having a supporting plate member with a dished central portion of spherical curvature with an aperture therein, four legs secured on said plate member and extending downwardly and outwardly therefrom, a chassis supporting member including a chassis supporting plate having a dished central portion of spherical curvature with a greater radius of curvature than said first named spherical dished portion and having a slot therein, a plurality of hairpin shaped supporting arms formed of metal rod supported on said chassis supporting plate and having outer rebent end portions lying in a common plane and adaptable to receive the supporting feet of a television receiver, said chassis supporting plate being positioned with its spherical dished portion positioned on and rotatable in the dished portion of said base supporting plate member, supporting means including a post extending through said plate members and resilient means securing said plate members together for relative rotary movement therebetween, and said chassis supporting member being rotatable on said supporting post and said slot permitting said chassis supporting member to be tipped forward or backward from a horizontal position.

2. A rotary stand for television receiver having supporting feet including in combination, a base having a supporting plate member with a dished central portion of spherical curvature with an aperture therein, four legs secured on said plate member and extending downwardly and outwardly therefrom, a chassis supporting member including a chassis supporting plate having a dished center portion of spherical curvature with a greater radius of curvature than said first named spherically dished portion and having a slot therein, a plurality of hairpin shaped supporting arms formed of metal rod and supported on said chassis supporting plate and having outer rebent end portions lying in a common plane and adapted to receive the supporting feet of a television receiver, said chassis supporting plate being positioned with its spherically dished portion supported on and rotatable in the dished portion of said base supporting plate member with said slot aligned with said aperture, a supporting post extending through the aperture and slot of said plate members to secure the same together for rotary movement, said chassis supporting member being rotatable on said supporting post with said slot permitting said chassis supporting member to be tipped forward or backward from horizontal position, and spring means holding said spherically dished portions resiliently in engagement to hold said chassis supporting member in any position in which it is set.

3. A rotary stand for a television receiver including in combination a base having a supporting plate member with a dished central portion of spherical curvature with an aperture therein, four legs secured on said plate member and extending downwardly and outwardly therefrom, a chassis supporting member including a chassis supporting plate having a dished center portion of spherical curvature with a greater radius of curvature than said first named spherically dished portion and having a slot therein, a plurality of hairpin shaped supporting arms formed of metal rod and supported on said chassis supporting plate and having outer rebent end portions lying in a common plate and adapted to receive the supporting feet of a television receiver, said chassis supporting plate being positioned with its spherical dished portion on and rotatable in the dished portion of said base supporting plate member with said slot aligned with said aperture, a hollow supporting post extending through said plate members to secure the same together for rotary movement, a clamping member of spherical curvature on one side and flat on the other side and having an aperture therethrough, said clamping member fitting over said supporting post and abutting the spherical dished portion of said chassis supporting plate, a retaining bolt having a head portion engageable with said clamping member and extending through said hollow supporting post, a spring washer fitting over said bolt, a nut holding said spring washer against the lower end of said hollow post to clamp said clamping member against said chassis supporting plate, said chassis supporting member being rotatable on said supporting post with said slot permitting said chassis supporting member to be tipped forward or backward from a horizontal position, and said bolt and spring washer and clamping member providing a spring means holding the dished portion of said chassis supporting member resiliently in engagement with said base supporting plate to provide frictional force to hold said chassis supporting member and a television set supported thereon in any position in which it is set.

References Cited in the file of this patent

UNITED STATES PATENTS

| | | |
|---|---|---|
| D. 173,368 | Moyer | Nov. 2, 1954 |
| 931,692 | Eyfe | Aug. 17, 1909 |
| 1,754,094 | Glass | Apr. 8, 1930 |
| 1,794,726 | Mitchell | Mar. 3, 1931 |
| 1,805,674 | Ramsperger | May 19, 1931 |
| 2,471,569 | Hay | May 31, 1949 |